United States Patent [19]

Ducote

[11] Patent Number: 5,392,872
[45] Date of Patent: Feb. 28, 1995

[54] AXLE ASSEMBLY AND CONFIGURATION

[76] Inventor: Edgar A. Ducote, P.O. Box 45654, Baton Rouge, La. 70895

[21] Appl. No.: 130,470

[22] Filed: Oct. 1, 1993

Related U.S. Application Data

[60] Continuation-in-part of Ser. No. 807,199, Dec. 16, 1991, Pat. No. 5,305,844, which is a division of Ser. No. 594,716, Oct. 9, 1990, Pat. No. 5,135,064, which is a continuation-in-part of Ser. No. 337,292, Apr. 13, 1989, Pat. No. 5,026,085.

[51] Int. Cl.$^6$ .............................................. B62D 61/10
[52] U.S. Cl. .............................. 180/24.01; 301/124.1; 280/98
[58] Field of Search ................ 180/24.01, 140, 24, 180/23, 155; 301/124.1, 132, 131; 280/91, 98, 103, 426, 442, 443, 444

[56] References Cited

U.S. PATENT DOCUMENTS

| | | | |
|---|---|---|---|
| 1,945,921 | 2/1934 | Shaffer | 280/33.5 |
| 2,052,645 | 9/1936 | Norman | 280/33.55 |
| 2,312,646 | 3/1943 | Hunt | 280/33.55 |
| 2,411,836 | 11/1946 | Seckel | 301/124.1 X |
| 2,444,025 | 6/1948 | Austin | 180/24.01 X |
| 2,659,611 | 11/1953 | Henry | 280/33.55 |
| 2,698,668 | 1/1955 | McKay | 180/24.01 |
| 3,322,439 | 5/1967 | Le Mmon | 280/426 |
| 3,448,999 | 6/1969 | Kollander et al. | 280/426 |
| 3,876,240 | 4/1975 | Watson | 280/443 |
| 4,441,730 | 4/1984 | Damm | 280/426 |
| 4,451,058 | 5/1984 | Cumming | 280/423 A |
| 4,740,006 | 4/1988 | Ducote | 280/426 |
| 4,941,671 | 7/1990 | Ellingsen | 180/24.01 |
| 4,982,976 | 1/1991 | Kramer | 280/426 |
| 5,013,057 | 5/1991 | Vänninmaja et al. | 280/426 |
| 5,026,085 | 6/1991 | Ducote | 280/426 |
| 5,029,885 | 7/1991 | Steiner | 301/124.1 X |
| 5,071,152 | 12/1991 | Ducote | 280/426 |
| 5,088,570 | 2/1992 | Loeber | 180/24.01 |
| 5,123,669 | 6/1992 | Ducote | 280/426 |
| 5,135,064 | 8/1992 | Ducote | 180/140 |
| 5,139,103 | 8/1992 | Ducote | 180/140 |
| 5,232,238 | 8/1993 | Ducote | 280/426 |
| 5,305,844 | 4/1994 | Ducote | 180/24.01 |

FOREIGN PATENT DOCUMENTS

| | | | |
|---|---|---|---|
| 699566 | 2/1931 | France | 180/24.01 |
| 762327 | 4/1934 | France | 180/24.01 |
| 863534 | 4/1941 | France | 180/24.01 |
| 362687 | 9/1938 | Italy | 180/24.01 |
| 23017 | 10/1904 | United Kingdom | 180/24.01 |
| 435326 | 9/1935 | United Kingdom | 180/24.01 |

*Primary Examiner*—Margaret A. Focarino
*Assistant Examiner*—Kevin Hurley
*Attorney, Agent, or Firm*—Reginald F. Roberts, Jr.

[57] ABSTRACT

An axle assembly and configuration of axle assemblies for a mobile vehicle. The axle assembly includes a fixed axle fastened to the frame of the vehicle so that the axle maintains a fixed orientation with respect to the vehicle frame. A steerable spindle is connected to each end of the axle by a vertical king pin. The axle is straight beam, king pin to king pin, with the king pins lying on the longitudinal axis of the axle, thus eliminating caster. The configuration of axle assemblies includes a fixed axle with fixed wheels and a fixed axle with steerable wheels. The axles are straight beam, king pin to king pin, with the king pins lying on the longitudinal axes of the axles. The axles are separated by a distance of at least about ten feet.

2 Claims, 7 Drawing Sheets

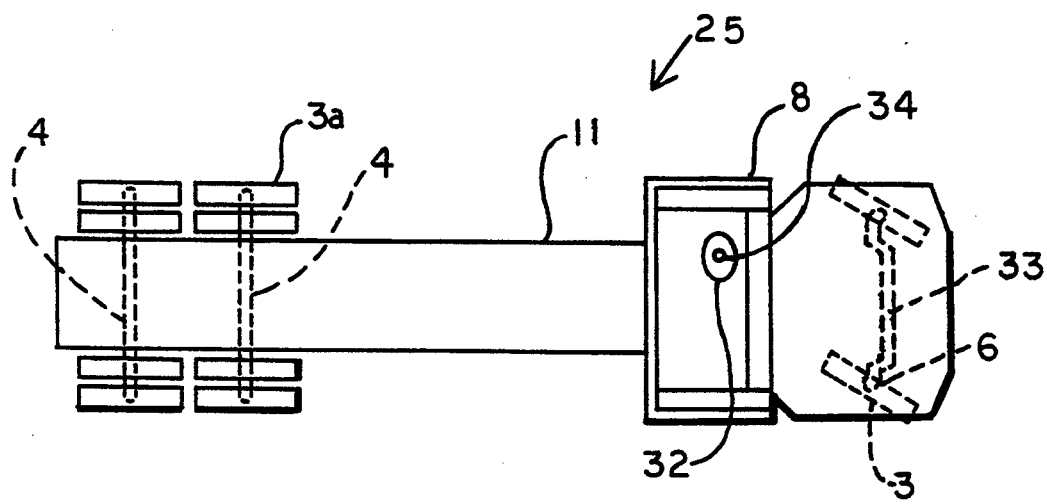
PRIOR ART • FIGURE 6
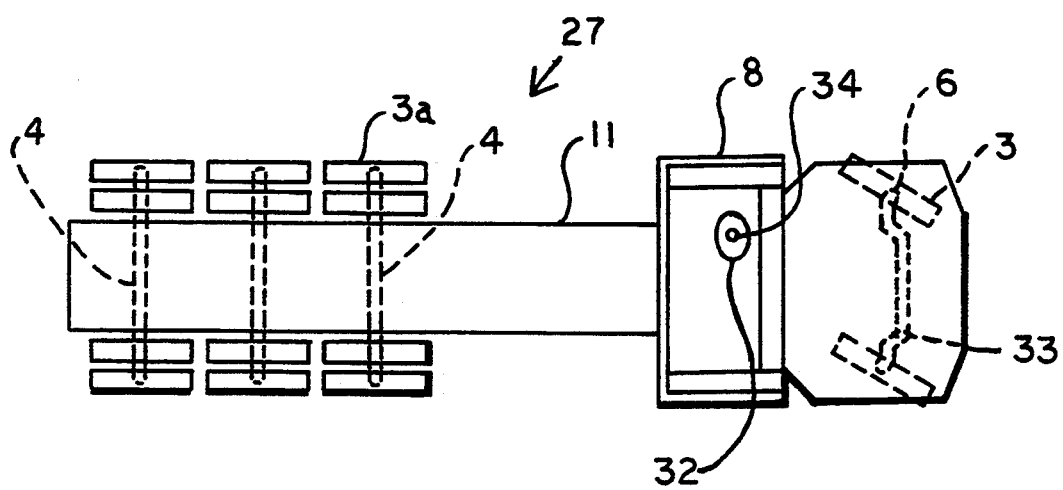
PRIOR ART • FIGURE 7

AXLE ASSEMBLY AND CONFIGURATION

CROSS-REFERENCE TO RELATED APPLICATIONS

This is a continuation-in-part of application Ser. No. 807,199, filed Dec. 16, 1991, U.S. Pat. No. 5,305,844, which is a division of application Ser. No. 594,716, filed Oct. 9, 1990, U.S. Pat. No. 5,135,064, which is a continuation-in-part of application Ser. No. 337,292, filed Apr. 13, 1989, U.S. Pat. No. 5,026,085.

BACKGROUND OF THE INVENTION

The present invention relates to mobile vehicles. More particularly, the invention relates to on-highway vehicles designed to operate at highway speeds.

Special terms used herein are defined as follows:

Forward: Toward the front end of the vehicle.

Aft: Toward the rear end of the vehicle.

Highway speeds: Speeds in excess of fifty miles per hour.

Extended motor vehicle: A motor vehicle having an elongated, integral chassis.

Elongated: Substantially longer than a conventional automobile; having a length of from about fifteen to about forty feet.

Integral: Unitary; not segmented; not formed e.g. like a tractor-trailer.

Axle: A shaft which connects wheels located on opposite sides of a frame which is supported by the shaft.

Short axle: A shaft which connects a pair of wheels on the same side of the frame.

Spindle: A short conical shaft on which a wheel is mounted.

Driving axle: Axle that is power-driven.

Fixed axle: An axle permanently aligned in a particular configuration with respect to the frame.

Steerable axle: An axle which is capable of changing orientation with respect to the frame.

Tandem axles: A pair of axles very near one another; not spaced apart or separated by a distance of more than about two or three feet.

Tridem axles: Three axles very near one another; not spaced apart or separated by a distance of more than about two or three feet.

Spread axles or spread-tandem axles: Axles spaced apart and separated by a distance of about ten feet.

Fixed wheel: A wheel the orientation of which remains unchanged with respect to an axle on which the wheel is mounted.

Steerable wheel: A wheel which is capable of changing direction with respect to and independently of a fixed axle to which the wheel is connected by a spindle.

Much of the background information relating to the present invention may be found in U.S. Pat. Nos. 4,740,006, 5,026,085, 5,071,152, 5,123,669, 5,135,064, 5,139,103, and 5,232,238 to Ducote, and in application Ser. No. 807,199 by Ducote. Said patents and application are hereby incorporated by reference.

Mobile vehicles encompassed by the present invention include tractor-trailers, recreation-vehicle (RV) motor homes, boat-trailer assemblies, trucks, busses, moving vans, passenger vans, and fire engines.

Trucks, tractors, and trailers are well described in the *Encyclopedia Britannica*, volume 18, pages 721–723, hereby incorporated by reference.

Axles with forcibly-steered wheels are disposed at the front ends of automotive vehicles. The wheels are manually steered by a driver by means of a steering wheel. The axles are designed to have a single wheel with a tire at each end of the axle. Rotary movement of the steering wheel causes the ends of the steerable spindles on which the wheels are mounted to move forward or rearward. The wheels mounted on the spindles change lateral alignment with the vehicle. This causes the vehicle to steer to the right or to the left.

In 1984 the U.S. Department of Transportation published the Bridge Gross Weight Formula $$W = 500[LN/(N-1) + 12N + 36]$$

in which $W$ = the maximum weight in pounds that can be carried on a group of two or more axles to the nearest 500 pounds $L$ = spacing in feet between the outer axles of any two or more consecutive axles and $N$ = number of axles being considered This formula pertains to eighteen-wheelers and single-unit trucks using the interstate highway system.

The Bridge Gross Weight Formula provides a standard to regulate the spacing of trailer and truck axles, and the maximum weight that single axles and axle groups are permitted on interstate highways. The weight limits for the interstate highway system are twenty thousand pounds per single axle, thirty-four thousand pounds per tandem axles, and eighty thousand pounds total gross weight.

Marine intermodal containers were introduced in 1963. The length of an intermodal container was originally twenty or forty feet. This is an efficient way to move freight. Container-handling equipment moves a twenty or forty-foot box. This, in lieu of stevedores' moving sacks or crates. This efficient concept has been introduced into shipping by steamships, trucks, and railways. There is no legal limit to the weight which steamship and railroads can carry. The gross weight that eighteen-wheelers can carry via intermodal containers is limited to eighty thousand pounds.

In 1983 the trailer moiety of tractor-trailers was forty-two feet in length. Trailers being built today—19-93—are between forty-eight and fifty-three feet in length. Domestic intermodal containers are now also between forty-eight and fifty-three feet long. These containers are collected by trucks and delivered to a railhead. The "long haul" is by rail. At the end of the rail trip the domestic containers are reloaded onto trucks for delivery at their destination. The permissible gross weight of each truck is again eighty thousand pounds.

The domestic intermodal containers are double-stacked on the rail cars. First the forty-eight-foot containers are onloaded; then fifty-three-foot containers are placed on top of the forty-eight-foot containers.

Much study has been given to increasing the productivity and efficiency of our surface transportation system. Advances have been made in increasing the cubage for low-density commodities. The industry is striving for an increase in allowable truck gross weight. The allowance for the axle groups specified in the Bridge Formula are thirty-four thousand, thirty-four thousand, and twelve thousand pounds for trailer tandem, tractor tandem, and truck front axles, respectively. The sum of these allowances is eighty thousand pounds. Full parity is allowed for axle groups and for the vehicle gross weight. Increased allowance for axle groups which would increase the total allowable gross weight for the vehicle would be abusive and eventually destructive of the highways and the interstate infrasystem.

The Bridge Formula specifies an allowable weight of twenty thousand pounds per single axle. A configuration of five single axles would yield a significant increment in allowable vehicle gross weight. The individual axle allowances of twenty thousand, twenty thousand, twenty thousand, and twenty thousand pounds, plus twelve thousand pounds for the front axle, adds up to a total of ninety-two thousand pounds. An increase in allowable gross weight from eighty thousand pounds for the conventional eighteen-wheeler to even eighty-eight thousand pounds (as was "grandfathered" into the regulations after the Bridge Formula was applied) would result in a payload increase of twenty-two percent. A street or highway sustains less wear from a single axle carrying twenty thousand pounds than from a pair of tandem axles carrying thirty-four thousand pounds. The force or pressure of the weight from axle groups on the road foundation is said to be directed in the form of a triangle with the vertex pointed down at the road surface.

Roads that easily sustain traffic wear from a twenty-thousand-pound single axle may not sustain traffic wear from a pair of thirty-four-thousand-pound tandem axles. If the road foundation should rest on substandard soil, or if there is water seepage through the soil on which the road foundation rests, the foundation may eventually crumble. It is therefore a significant benefit to have a twenty-thousand-pound single axle load on a street or roadway instead of a thirty-four-thousand-pound tandem load.

The Federal Bridge Formula pertains to interstate highways. States, counties or parishes, and municipalities have jurisdiction over streets and roads within their domain which they have built and which they maintain. A city, county/parish, or state can enact legislation or regulations which provide for increased permissible gross weight for axle configurations comprising five single axles. This increase would apply to marine and domestic intermodal containers on trailers and truck chasses. The containers can be moved by trucks within a city, county, parish, or state which has increased the gross allowance. They can be moved by rail across a region that does not allow the increase in truck/trailer gross weight, to another city, country, parish, or state which does allow said increase.

SUMMARY OF THE INVENTION

In general, the present invention in one aspect provides an axle assembly for a mobile vehicle having a frame. The axle assembly comprises a fixed axle having first and second ends and a longitudinal axis. The axle is fastened to the frame of the mobile vehicle, and is constructed and arranged so that the axle maintains a fixed orientation with respect to the frame of the mobile vehicle.

A first spindle is connected to the first end of the axle by a first vertical king pin. A second spindle is connected to the second end of the axle by a second vertical king pin.

The axle is straight beam, king pin to king pin, with the king pins lying on the longitudinal axis of the axle, thereby excluding the property of caster.

In a second aspect the invention provides a configuration of axle assemblies for supporting a mobile vehicle having a frame. The configuration comprises a first fixed axle having a longitudinal axis and first and second ends. The first axle is fastened to the frame of the mobile vehicle, and is constructed and arranged so that the axle maintains a fixed orientation with respect to the frame of the mobile vehicle.

A second fixed axle having a longitudinal axis and first and second ends is fastened to the frame of the mobile vehicle, and is constructed and arranged so that the axle maintains a fixed orientation with respect to the frame of the mobile vehicle.

A first fixed wheel is mounted on the first end of the first axle, and a second fixed wheel is mounted on the second end of the first axle.

A first steerable wheel is connected to a first spindle mounted on the first end of the second axle, and a second steerable wheel is connected to a second spindle mounted on the second end of the second axle.

The first and second axles are displaced from one another by a distance of at least about ten feet.

BRIEF DESCRIPTION OF THE DRAWINGS

FIG. 6 is a plan view of a prior-art extended motor vehicle having tandem axles.

FIG. 7 is a plan view of a prior-art extended motor vehicle having tridem axles.

DETAILED DESCRIPTION OF THE INVENTION

Figure 1:
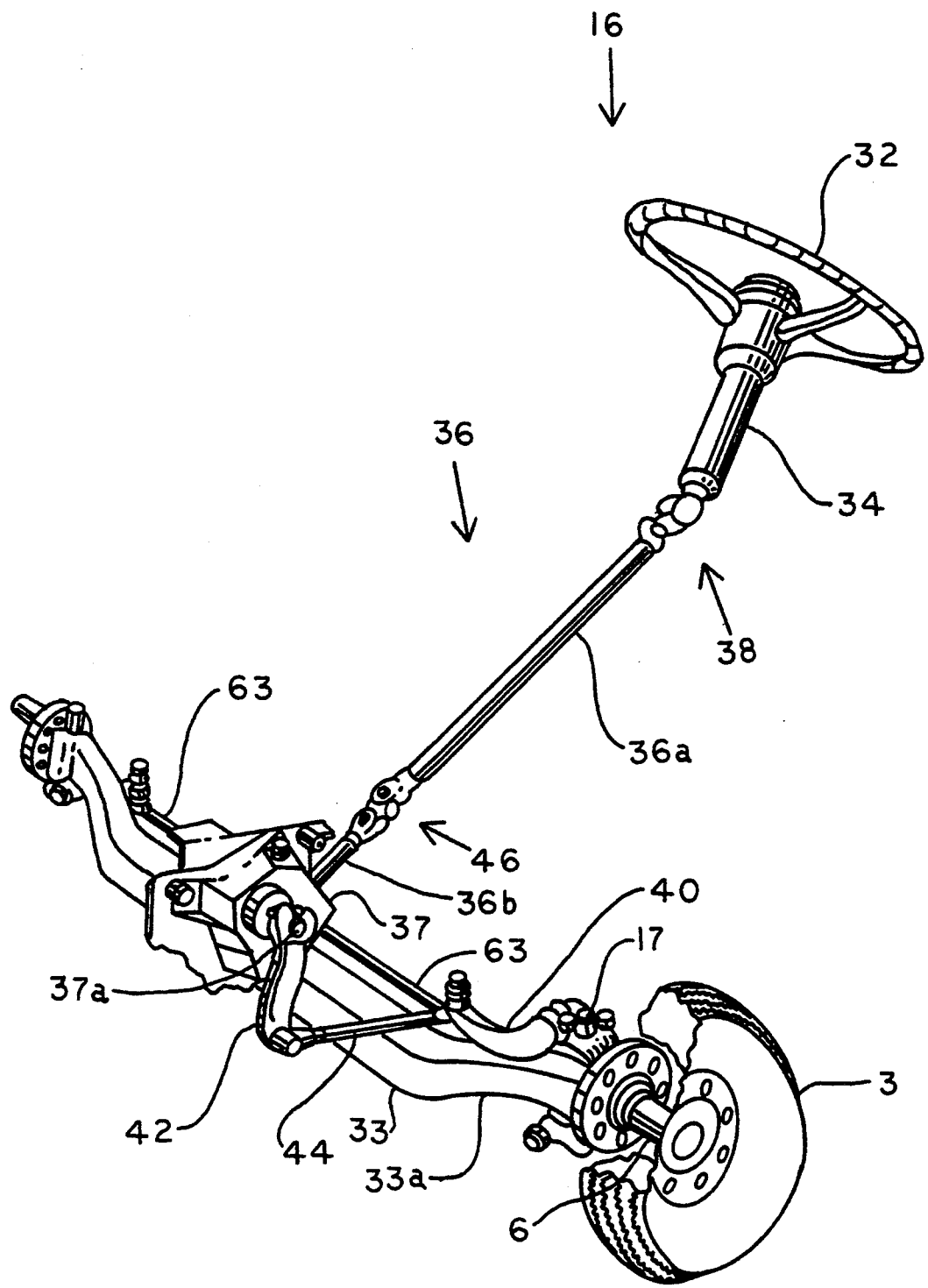
FIG. 1 is an isometric view of a prior-art steering system.

More specifically, reference is made to FIG. 1, in which is shown a prior-art system for steering a front pair of steerable wheels supporting the front end of an automotive vehicle, the system being generally designated by the numeral 16.

The steering system 16 comprises a steering wheel 32, a steering column 34, a steering shaft 36 comprising upper and lower segments 36a and 36b, respectively, a first universal joint (U-joint) 38 connecting the upper segment 36a of the steering shaft 36 to the steering column 34, a second U-joint 46 connecting the upper and lower segments 36a and 36b of the steering shaft 36 to one another, a steering-gear box 37, a pitman arm 42, a drag link 44, a steering arm 40, a tie rod 63, and steerable wheels 3 rotatably mounted on spindles 6. The pitman arm 42 is connected to the gear box 37 by a short shaft 37a.

A fixed axle 33 has curved segments 33a at each end of the axle 33, and each spindle 6 is connected to each curved segment 33a at each end of the axle 33 by a vertical king pin 17. Significantaly, curving parts of the axle 33 and connecting the spindles 6 to the curved segments 33a at the ends of the axle 33 by the king pins 17 introduces an appreciable degree of caster in the wheels 3, axle 33, king pins 17, and steering system 16. Caster interferes with precise steering of the wheels 3.

Figure 2:
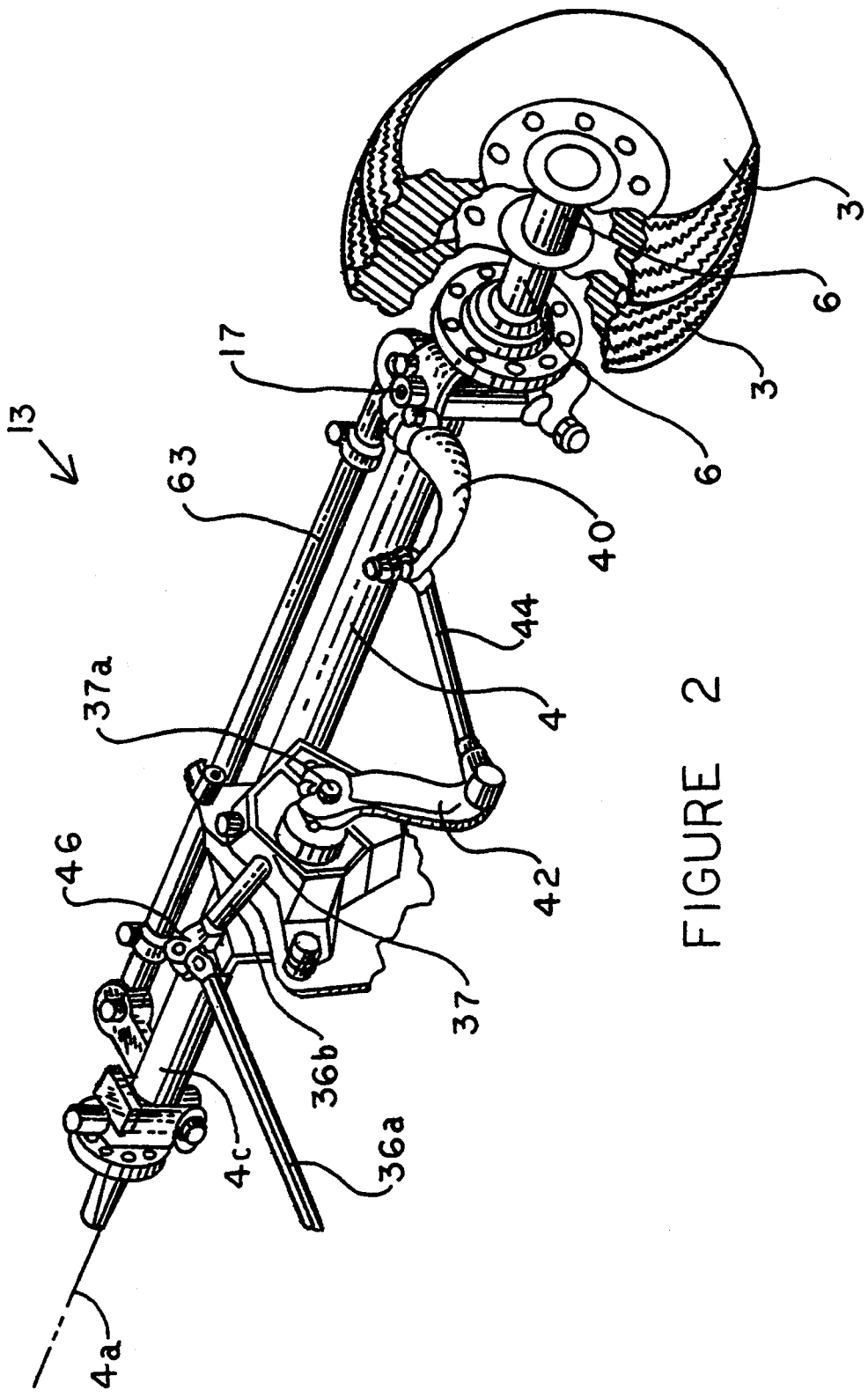
FIG. 2 is an isometric view of a steering system made in accordance with the principles of the present invention.

Reference is now made to FIG. 2, in which is shown a steering system made in accordance with the principles of the present invention, and generally designated by the numeral 13. The steering system 13 comprises a fixed axle 4 having a longitudinal axis 4a, and first and second ends 4b and 4c, respectively. A first pair of spindles 6 is connected to the first end 4b by a first vertical king pin 17. A second pair of spindles (not shown) is connected to the second end 4c of the axle 4 by a second vertical king pin (not shown). A first pair of steerable wheels 3 are mounted on the first pair of spindles 6, and a second pair of steerable wheels (not shown) are mounted on the second pair of spindles (not shown).

Significantly, the axle 4 differs from the curved prior-art axle 33 by being straight-beam, king pin to king pin, with the king pins 17 lying on the longitudinal axis 4a of the axle 4, thereby excluding the property of caster and permitting the steerable wheels 3 to be more accurately steered.

The remainder of the steering system 13 between the wheels 3 and the gear box 37 is similar to the corresponding parts of the prior-art system 16 shown in FIG. 1.

Preferably the axle 4 is tubular. Even more preferably, the diameter of the axle 4 is about five inches. A fork with apertures is disposed at each end of the axle 4, so that a vertical king pin can be inserted therein. The inside end of the spindle, called a knuckle, is formed to fit into the axle fork. With the spindle in place, the king pin is inserted into the top of the fork through a sleeve in the knuckle and through the bottom of the fork.

The axle 4 has steerable spindles 6 responsive to being forcibly steered by remote control from a towing vehicle or from the steering wheel of an extended motor vehicle. Remote-control steering may include means for sensing the direction of motion of the towing vehicle, as well as means for transmitting the sensed direction of motion to the steerable spindles 6 mounted on the axle 4.

The axle assembly 13 is always used in combination with at least one other axle 4, the other axle being equipped with fixed spindles. Preferably, the axle assembly 13 is used in combinations disclosed and described in and by U.S. Pat. Nos. 4,740,006, 5,016,085, 5,071,152, 5,123,669, 5,135,064, and 5,139,103 to Ducote, and by a prior application by Ducote identified by Ser. No. 807,199, which have been incorporated by reference.

The axle assembly 13 has been manufactured as a prototype.

Figure 3:
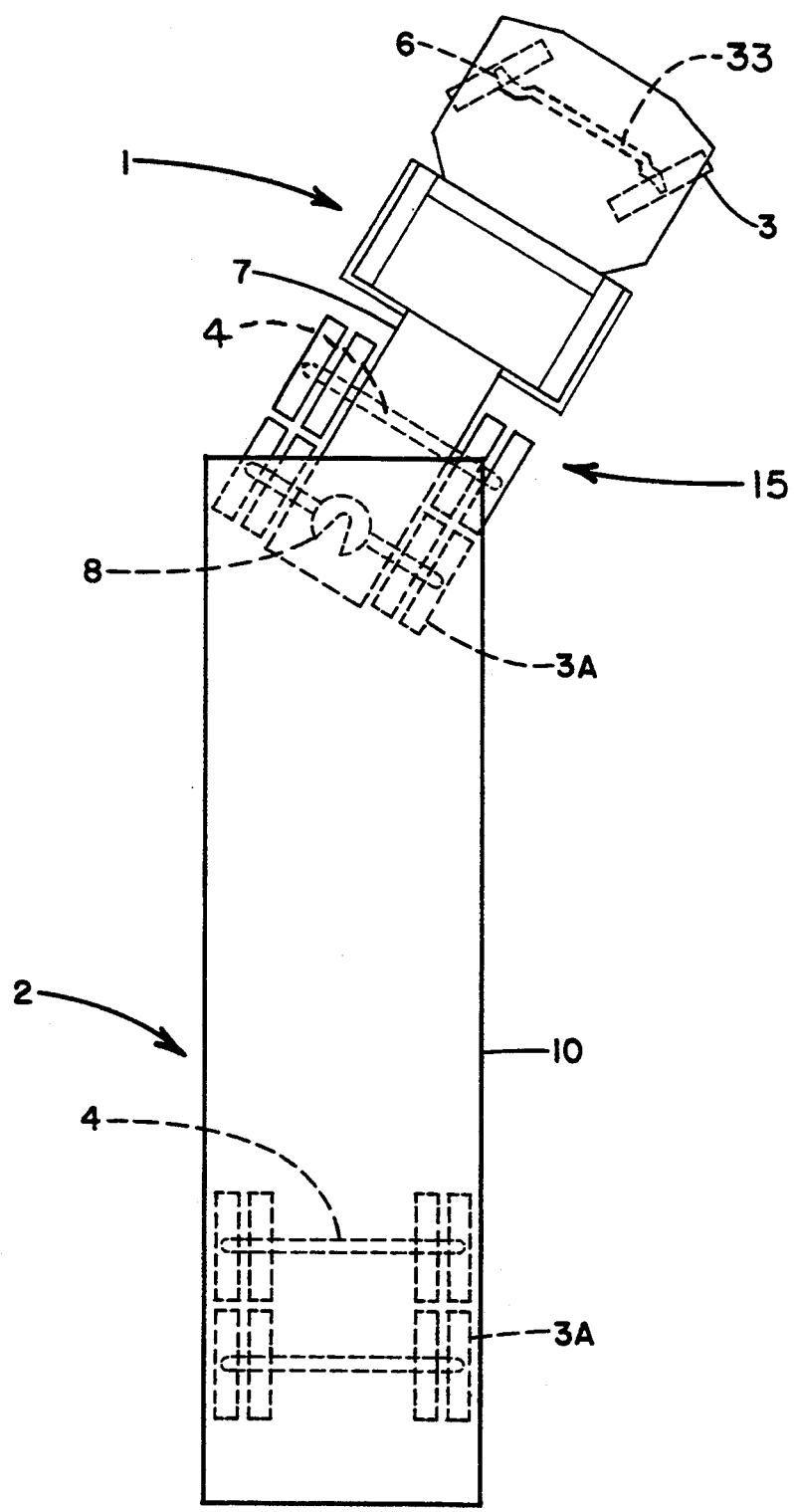
FIG. 3 is a plan view of a prior-art tractor-trailer having tandem axles.

Reference is now made to FIG. 3, in which is shown a prior-art tractor-trailer having tandem axles, generally designated by the numeral 15. The frame 10 of a trailer 2 is supported near the front by the frame 7 of a tractor 1. The frame 7 is supported by a fixed front axle 33 provided with a pair of steerable wheels 3 mounted on a pair of spindles 6, and by two fixed rear axles 4, each of which is provided with two pairs of fixed wheels 3a. The trailer frame 10 is further supported by two fixed axles 4 near the rear of the trailer 2. Each of these rear axles 4 is likewise provided with two pairs of fixed wheels 3a. A "fifth wheel" 8 is fastened to the frame 7 of the tractor 1.

There are serious disadvantages inherent in the tractor-trailer 15. The following examples are illustrative of the problems inherent therein.

(1) Because the only axles supporting the frame 10 of the trailer 2 are the two rear axles 4, approximately half the weight of the trailer 2 is borne by the frame 7 of the tractor 1. An immediate consequence of this burden on the tractor 1 is that tractors pulling such trailers (the type of tractor-trailer known commonly as an "eighteen-wheeler") must be large, heavy, and rugged enough to bear about half the weight of the trailer and of the payload, as well as the weight of the tractor itself. Clearly, if part of this extra weight could be borne by the trailer, it would be possible to utilize lighter and less expensive tractors. Furthermore, the portion of the fuel utilized to move the tractor alone could be considerably reduced, leading to even greater savings and to a significant advantage in fuel economy and energy conservation.

(2) Because there are only fixed wheels 3a supporting the trailer 2, it is impossible for the trailer 2 to turn without some of the wheels 3a skidding or dragging to some extent. The farther apart the rear axles 4, the more serious is the problem of wheel drag. This problem causes loss of control, wasteful loss of rubber from the tires mounted on the wheels 3a, and wasteful loss of the extra energy required to overcome sliding friction as opposed to rolling friction. The trailer 2 is unstable in a turn. The greater the speed and the sharper the turn, the greater the instability.

(3) The fifth wheel 8 of the tractor 1 furnishes a leg to support the front end of the trailer 2. However, it does not furnish full support for the full width of the front end of the trailer 2. This deficiency causes the bed (not shown) of the trailer 2 to rock down on one side and up on the other side. The extent to which such rocking occurs depends on the turns that the trailer 2 makes, the imbalance of the load (which can be caused by shifting of the cargo in transit), road conditions, and other variables. This particular type of instability is almost continuous while the eighteen-wheeler 15 is in motion.

(4) Often the longitudinal center of the trailer, when loaded, is in continual up-and-down motion. This motion contributes to the instability of the trailer 2, and may in extreme cases cause the trailer 2 to collapse at the longitudinal center.

(5) The looseness of the trailer king pin (not shown) in the fifth wheel 8 of the tractor 1 causes some shock, which contributes to a deficiency in traction and to a rough ride for both cargo and driver.

(6) Tandem axles are not equivalent to two single axles. Transportation authorities do not allow as much weight to be carried by a pair of tandem axles as by a pair of single axles.

Tandem axles on either the tractor 1 or the trailer 2, because they drag in a turn, can individually or in combination initiate a slide of the eighteen-wheeler 15 into a "jack-knife."

(8) The trailer 2 cannot independently furnish braking for the trailer and its payload (not shown). The push of the trailer 2 against the tractor 1 when brakes are applied to the tractor 1 causes the tractor 1 to yaw.

(9) There is nothing between the trailer 2 king pin (not shown) and the rear axles 4 of the eighteen-wheeler 15 to function as a load-bearing stabilizer for the trailer 2. It is part of the function of the massive tractor 1 to counteract the sideward pull of the trailer 2 upon the tractor 1 when the tractor changes direction at highway speeds. The sharper the turn and the greater the speed, the greater is the pull of the trailer 2 on the tractor 1.

(10) The existence of the problems just enumerated has caused the gradual emergence of heavier and more massive tractors 1. These massive tractors have larger engines. The role of the tractor 1 is to pull, to steer, and to give stable traction to the eighteen-wheeler 15 while carrying its cargo at highway speeds. The heavier tractors 1, along with Transportation Department load limits on tandem axles 4, cause the eighteen-wheeler 15 to carry less of a payload. The increased power of the tractor 1 engines (not shown) causes less fuel efficiency. These factors, in combination, raise the cost per ton-mile of freight substantially.

Figure 4:
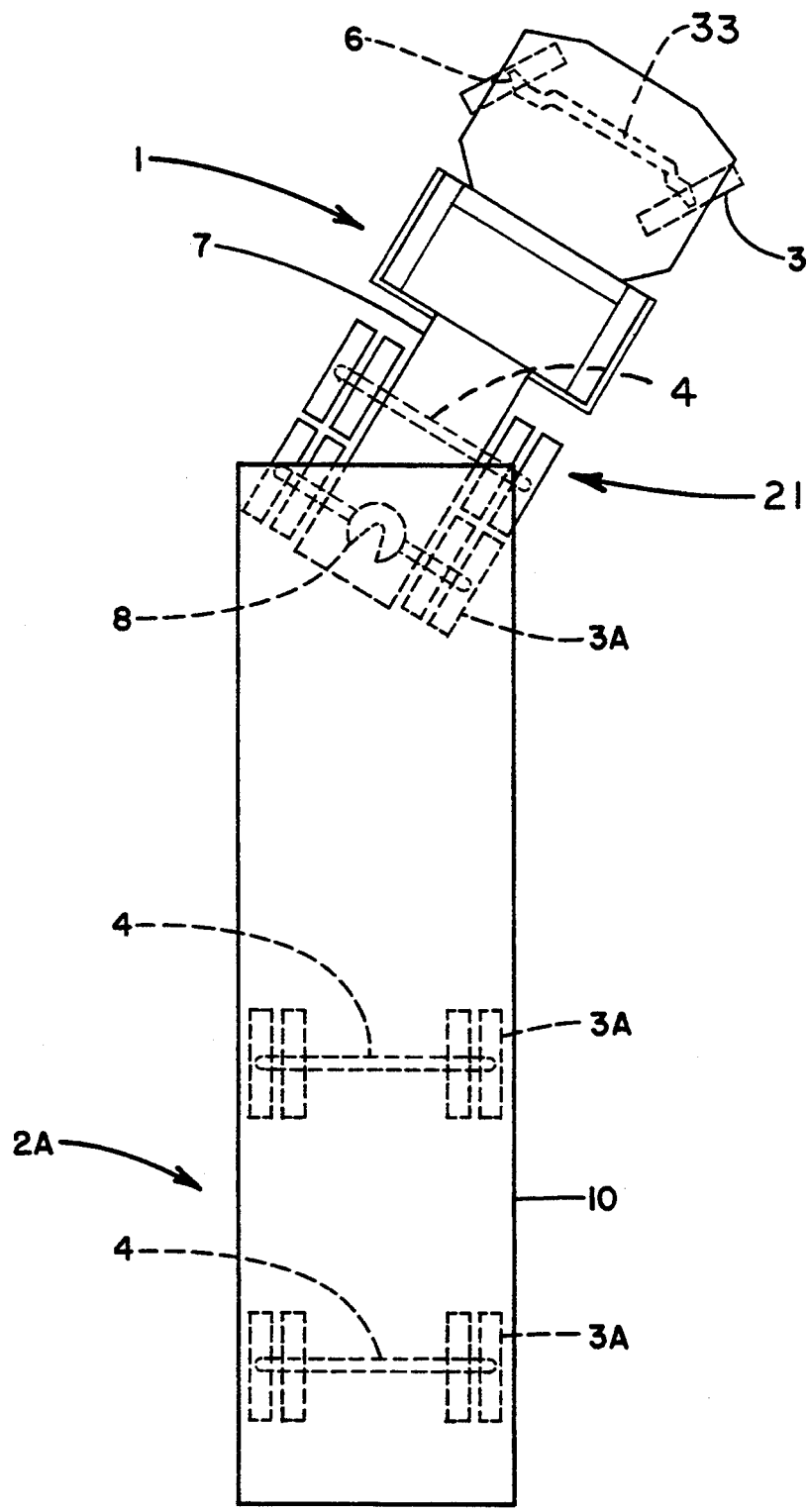
FIG. 4 is a plan view of a prior-art tractor-trailer having spread-tandem axles.

Reference is now made to FIG. 4, in which is shown a prior-art tractor-trailer having spread-tandem axles, generally designated by the numeral 21 and also generally known as an eighteen-wheeler. As stated above, the greater the distance between tandem axles, the more serious the problem of wheel-drag becomes. Spread-tandem axles are conventionally separated by a distance of about ten feet. A prior-art trailer having spread-tandem axles is shown in FIG. 4 and designated by the numeral 2a.

These rigid spread-tandem axles with fixed wheels add another dimension to turning, in that these spread axles must be dragged around to make the turn. The distance by which the tires and wheels are dragged depends on the individual axle loads and the road surface under each of the tires. In any case they must be dragged into alignment, for every turn that the rig makes. To compensate for this sideways dragging, the driver makes an extra-wide turn. So, in the first place the driver turns wide to accommodate the length of the trailer, and in the second place the driver turns wider still to have additional distance for the dragging and inability of the rigid tandems to turn. The reason that the rigid spread tandems are used is that they are allowed the axle weight of single axles. This allowable weight is 20,000 pounds per axle. This helps them get through the Department of Transportation weight scales. This severe problem is evident at the access and exit ramps of interstate highways.

These problems are always with the driver. When driving in cities, the driver must find an intersection at which the driver is able to make a turn. The turn that is made is seldom an easy turn; it is a turn that the driver is barely able to make. Thus the driver and the rig must roll until the driver is able to find a suitable intersection. The time spent finding this begins at the point that the vehicle is loaded, and ends at the point the load is discharged.

Figure 5:
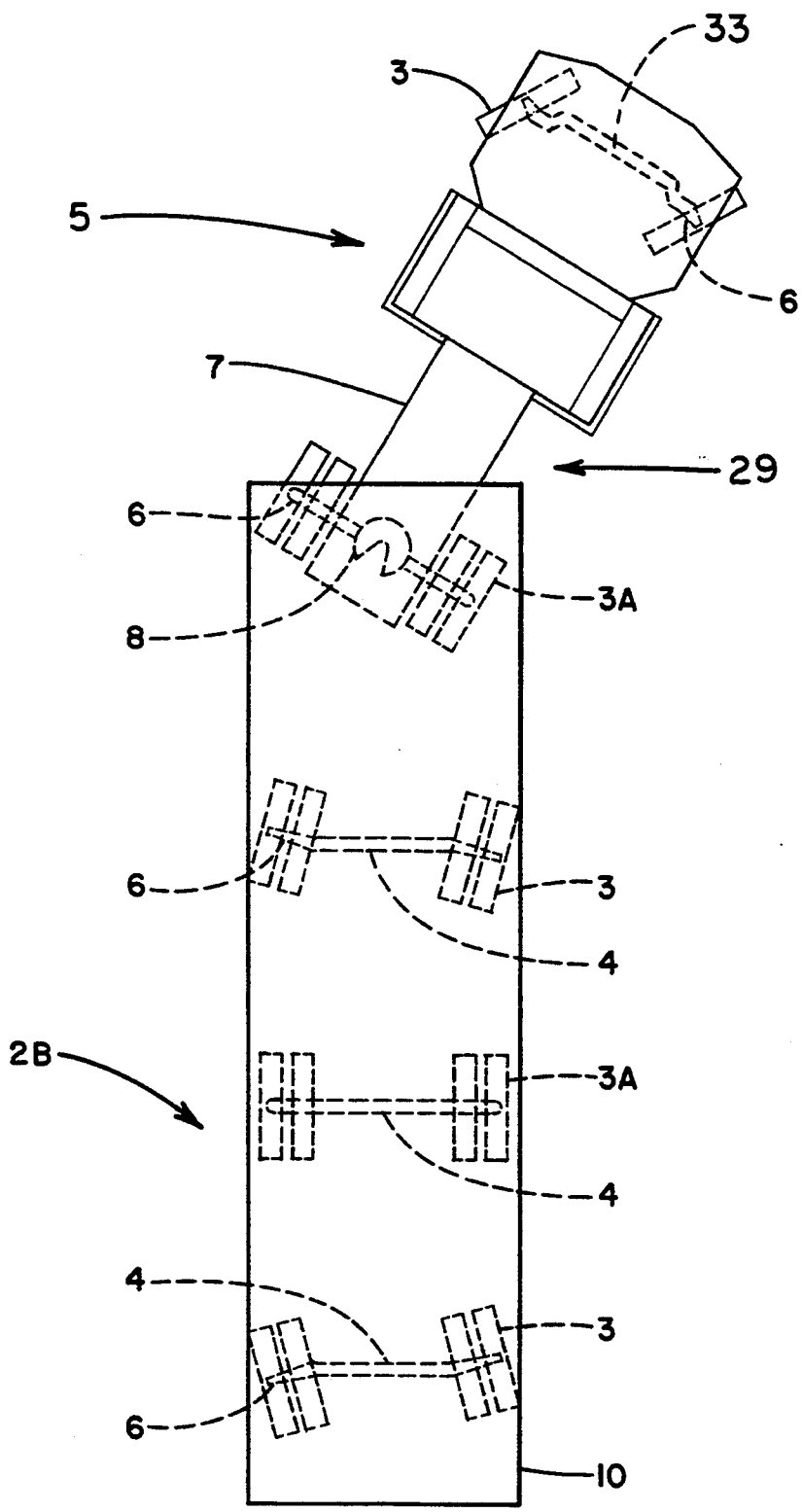
FIG. 5 is a plan view of a tractor-trailer made in accordance with the principles of the present invention.

Reference is now made to FIG. 5, in which is shown a tractor-trailer made in accordance with the principles of the present invention, and generally designated by the numeral 29. A tractor 5 includes a frame 7, a pair of steerable front wheels 3 mounted on spindles 6 and pivotally connected by king pins 17 (as shown in FIG. 1) to a fixed axle 33, two pairs of fixed rear wheels 3a mounted on a second fixed axle 4, and a fifth wheel 8 fastened to the frame 7 of the tractor 5. The tractor 5 is articulated to a trailer 2b equipped in accordance with the principles of the present invention. The trailer 2b includes four pairs of steerable wheels 3 mounted on spindles 6 which are pivotally connected to two fixed axles 4 by king pins 17 (as shown in FIG. 2), and two pairs of fixed wheels 3a mounted on a fixed axle 4. The trailer 2b further includes a frame 10 which supports a body (not shown) such as, for example, a van, an intermodal container, a flat bed, or a tank, for supporting or containing a payload.

By comparing FIGS. 4 and 5, it may be seen that the four pairs of steerable wheels 3 of the stabilized eighteen-wheeler 9b (FIG. 5) beneficially replace two pairs of fixed wheels 3a of the tractor 1 and two pairs of fixed wheels 3a of the trailer 2a (FIG. 4). This modification substantially solves and eliminates the problems previously described for spread-tandem eighteen-wheelers, and offers the following advantages:

(1) More even distribution of weight and momentum when the tractor changes speed or direction of motion.

(2) Greater stability in turns; safer turning capability and maneuverability at high speeds. The higher the speed and the sharper the turn, the more important this aspect of the invention becomes. This feature represents an enormous saving with respect to driving time, and a tremendous safety asset for the prevention of overturning, "jack-knifing," and loss of control.

(3) Heavier pay loads borne safely by trailers modified and equipped according to the principles of the present invention. The increase in pay load is made possible by the use of lighter tractors, and by the increased stabilization and maneuverability of the trailers.

(4) Utilization of standard rather than specialized equipment. With the exception of the inventions disclosed by Ducote in his patents and application which have been incorporated by reference, steerable trailers are specially built, usually as a single unit and as special-purpose vehicles. The steering system of the present invention is designed to be installed as a retrofit to present-day state-of-the-art trailers, or as optional equipment for trailers not yet manufactured. It will be apparent, however, to those skilled in the art, that, if so desired, tractor-trailers could be specially made in accordance with the principles of the present invention.

(5) Automatic connecting and disconnecting of the steering system to and from the tractor. Prior-art systems, with the exception of those disclosed by Ducote in the patents incorporated by reference, are difficult to connect and disconnect, require special methods and equipment, and require a great deal of time and effort.

(6) An eighteen-wheeler with five single axles. There are no tandem axles; hence the disadvantages and limitations of the tandem axles are eliminated. The axle 4 and wheels 3 at or near the front end of the trailer span the entire width of the trailer, thereby providing positive and independent support for the front end of the trailer. The steerable front wheels 3 of the trailer absorb the pull to either side of the front end of the trailer 2b during turns, and reinforce the support provided by the fifth wheel of the tractor. The front wheels 3 of the trailer 2b act as a damper for the effect of looseness of fit of the trailer king pin (not shown) in the fifth wheel 8 of the tractor 5. Their fixed, load-bearing axles 4 located aft of the king pin (not shown) carry a substantial part of the trailer load, and eliminate or substantially reduce any vertical movement of the longitudinal center of the trailer. They largely absorb the "dive" at the front of the trailer and the "lift" at the rear end of the trailer 2b during braking. The steerable rear wheels 3 pivotally connected to the rear axle 4 turn as required in order to eliminate wheel-drag. The axle 4 and fixed wheels 3a near the center act as a pivot point.

These features contribute to making the trailer 2b an independently-controlled vehicle. The weight limit allowable for an eighteen-wheeler with five single axles is greater than that for an eighteen-wheeler with tandem axles. A lighter tractor 5 with less fuel consumption can safely pull such an improved trailer 2b. In combination, these factors decrease the cost of fuel per ton-mile for hauling freight by a very significant amount.

The trailer 2b is shown in FIG. 5 as having first and second sets of steerable wheels 3 pivotally connected to first and second fixed axles 4. The first set of steerable wheels 3 are located near the rear end of the trailer 2b, and if only one set of steerable wheels are to be used, that is the preferred location. Even more preferably, however, a second set of steerable wheels 3 is provided near the front end of the trailer 2b. Thus disposed, the two sets of steerable wheels 3 complement one another as just described.

The steerable wheels 3 on the trailer 2b are steered remotely and forcibly in response to means for sensing the direction of motion of the tractor 5 or the orientation of a steering wheel (not shown) in the tractor 5, and for transmitting the sensed direction of motion of the tractor 5 or the orientation of the steering wheel (not shown) in the tractor 5. A detailed description of said sensing and transmitting means is provided by the patents to Ducote and the application by Ducote which have been incorporated by reference.

It is to be noted and emphasized at this point that there is an important difference in structure and function between the axle 33 and steerable wheels 3 disposed at the front end of the tractor 5, and the axle 4 and steerable wheels 3 disposed under the trailer 2b. The purpose and function of the former is to steer and determine the direction of motion of the tractor 5. The purpose and function of the latter is to make fixed, spread, load-bearing axles functional. The tractor's steerable wheels 3 are steered manually. The trailer's steerable wheels 3 are forcibly, mechanically, and remotely steered to follow the steered direction of the wheels 3 at the front end of the tractor 5.

Reference is now made to FIGS. 6 and 7, which represent prior-art embodiments of extended motor vehicles.

A first prior-art embodiment 25 (FIG. 6) comprises a frame 11 mounted on a first fixed axle 33 with steerable wheels 3 connected thereto. This first axle 33 is positioned at or near the front end of the vehicle 25. A pair of fixed tandem axles 4 support the rear end of the vehicle 25. The tandem axles 4 are provided with fixed wheels 3a.

A second prior-art embodiment 27 is shown in FIG. 7. In this embodiment the frame 11 is mounted on a first fixed axle 33 having steerable wheels 3 at or near the front end of the vehicle 27, and a group of tridem fixed axles 4 with fixed wheels 3a at or near the rear end of the vehicle 27.

Special and serious problems are inherent in the vehicles depicted in FIGS. 6 and 7, because of the tandem and tridem axles 4 and the fixed wheels 3a. Each axle 4 of the tandem and tridem arrangement, when the vehicle 25 or 27 is making a turn, is continuously dragging and destabilizing the wheels 3a of the axles 4. This can cause loss of control to a greater or lesser extent, depending upon the speed of the vehicle and the sharpness of the turn. Other undesirable effects include excess tire wear and loss of the extra energy required to overcome the sliding friction of the wheels, as compared to rolling friction. Moreover, the sidewise dragging of the wheels 3a and axles 4 causes excessive wear of the axles, suspensions, and other components, thereby increasing maintenance and replacement costs. Fire trucks and other extended emergency vehicles are at risk with respect to loss of stability, particularly at high speeds and in congested traffic. All of these potential and inherent problems apply to mobile homes, recreational vehicles (RV), and extended military vehicles, as well as to tractor-trailers (eighteen-wheelers).

Whether single or double wheels are used in combination with the fixed, straight-beam axles 4 depends upon the kind and intended use of the mobile vehicle. Generally speaking, single wheels are more often used for recreation vehicles (RV's), while dual wheels are more often used for extended motor vehicles and are almost always used for the trailers of eighteen-wheelers.

A second problem inherent in the prior-art extended vehicles 25 or 27 is a long wheel base or turning radius. Because the only steerable wheels are in the front end of the vehicle, all of the strain of steering the vehicle in a turn falls thereon, with the frequent and predictable result that the front wheels fail to "grab." They slip, thereby causing the vehicle to make an excessively wide turn. In so doing, the vehicle often "rides" on the curb or swings into the lane of oncoming traffic. Both situations are rife with hazard.

Figure 8:
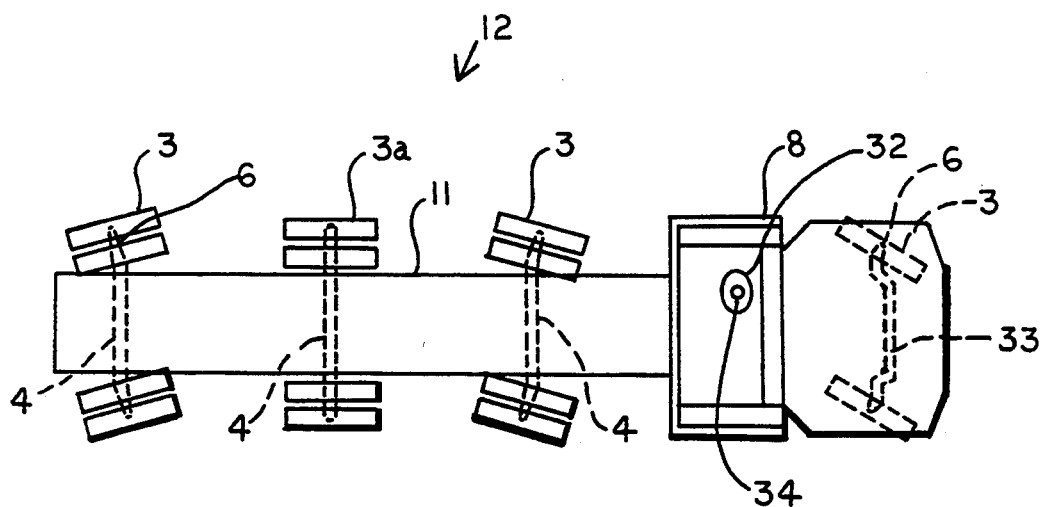
FIG. 8 is a plan view of a first embodiment of an extended motor vehicle made in accordance with the principles of the present invention.

Reference is now made to FIG. 8, wherein is shown a first embodiment of an extended motor vehicle made in accordance with the principles of the present invention, and generally designated by the numeral 12.

The motor vehicle 12 includes a frame 11. A body which includes a motor (not shown) and a cab 8 are mounted on the frame 11. Inside the cab 8 is a steering wheel 32 connected to a steering column 34. The body includes a seat for the driver, a front windshield, two side windows, and a hood disposed above the motor, none of which is shown in the drawing.

The frame 11 is mounted on first, second, third, and fourth fixed axles 33, 4, 4, and 4, respectively. The first axle 33 is located near the front end of the vehicle 12, and is equipped with two pairs of steerable wheels 3 mounted on spindles 6 attached to the axle 33 as shown in FIG. 1. The second axle 4 is located near the rear end of the vehicle 12, and is provided with two pairs of steerable wheels 3 rotatably mounted on spindles 6 attached to opposite ends of the axle 4 as shown in FIG. 2. The third axle 4 is disposed forward of the second axle 4, and is equipped with two pairs of fixed wheels 3a. The third axle 4 acts as a pivot when turns are made. The fourth axle 4 is disposed forward of the third axle 4, near the cab 8. The fourth axle 4 is equipped with two pairs of steerable wheels 3 on spindles 6 attached to opposite ends of the axle 4 as shown in FIG. 2. Means for transmitting the direction of motion defined by the orientation of the steering wheel 32 and for forcibly steering the steerable wheels 3 in accordance with the orientation of the steering wheel 32 and the geometry of the extended vehicle 12 are provided, but are not shown in the drawing.

Figure 9:
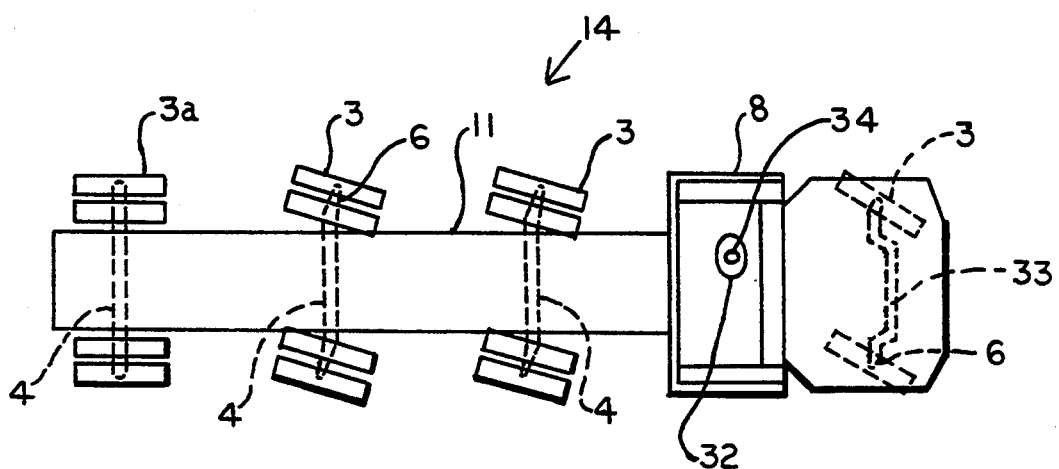
FIG. 9 is a plan view of a second embodiment of an extended motor vehicle made in accordance with the principles of the present invention.

Reference is now made to FIG. 9, in which is shown a second embodiment 14 of an extended motor vehicle made in accordance with the principles of the present invention.

The extended motor vehicle 14 comprises a body including a cab 8 mounted on a frame 11. The frame 11 is supported by first, second, third, and fourth fixed axles 33, 4, 4, and 4, respectively. The first axle 33 has steerable wheels 3, and is situated near the front end of the vehicle 14. The second axle 4 is near the rear end of the vehicle 14, and is equipped with fixed wheels 3a. The third axle 4, which is equipped with steerable wheels 3, is disposed forward of the second axle 4. The fourth axle 4, which has two pairs of steerable wheels 3, is disposed between the third axle 4 and the first axle 33, near the cab 8. A steering wheel 32 and steering column 34 direct the motion of the vehicle 14, and means (not shown) are provided for transmitting the direction of motion defined by the orientation of the steering wheel 32 to the steerable wheels 3 in accordance with the orientation of the steering wheel 32 and the geometry of the extended vehicle 14.

A detailed description of the means for transmitting the direction of motion defined by the orientation of the steering wheels 32 to the steerable wheels 3 mounted on the axles 4 supporting the extended motor vehicles 12 (FIG. 8) and 14 (FIG. 9) is provided by the patents to Ducote and the application by Ducote which have been incorporated by reference.

The distance between the fixed, straight-beam axles 4 supporting the trailers 2a and 2b in FIGS. 4 and 5, and supporting the extended motor vehicles 12 and 14 aft of the cabs 8 in FIGS. 8 and 9, is about ten feet. Thus, the distance separating the second axle 4 with fixed wheels 3a and the fourth axle 4 with steerable wheels 3 shown in FIG. 9 is about twenty feet.

It is foreseen that the required distance between spread axles could be different from/than ten feet for some vehicles. Pickup trucks, and vans for transporting passengers to and from airports are examples of vehicles which could become longer, and thereby provide further applications for the axle 4 and axle-assembly configurations utilizing the remote-steering technology of the present invention.

I claim

1. An extended unitary mobile vehicle, comprising:
   (a) a first fixed axle near the front end of the vehicle;
   (b) a first pair of steerable wheels pivotally mounted on spindles which are attached to opposite ends of the first axle;
   (c) a second fixed axle near the rear end of the vehicle;
   (d) second and third pairs of steerable wheels pivotally mounted on spindles which are pivotally attached by king pins to opposite ends of the second axle;
   (e) a third fixed axle disposed forward of the second axle;
   (f) first and second pairs of fixed wheels mounted on opposite ends of the third axle;
   (g) a fourth fixed axle disposed forward of the third axle and aft of the first axle; and
   (h) fourth and fifth pairs of steerable wheels pivotally mounted on spindles which are pivotally attached to opposite ends of the fourth axle;
   the second, third, and fourth axles being separated from one another by a distance of at least about ten feet.

2. An extended unitary mobile vehicle, comprising:
   (a) a first fixed axle near the front end of the vehicle;
   (b) a first pair of steerable wheels pivotally mounted on spindles attached to opposite ends of the first axle;
   (c) a second fixed axle near the rear end of the vehicle;
   (d) first and second pairs of fixed wheels mounted on opposite ends of the second axle;
   (e) a third fixed axle disposed forward of the second axle;
   (f) second and third pairs of steerable wheels pivotally mounted on spindles which are pivotally attached by king pins to opposite ends of the third axle;
   (g) a fourth fixed axle disposed between the first and third axles; and
   (h) fourth and fifth pairs of steerable wheels pivotally mounted on spindles which are pivotally attached to opposite ends of the fourth axle;
   the second, third, and fourth axles being separated from one another by a distance of at least about ten feet.

* * * * *